Oct. 23, 1923.                                              1,471,832
H. N. DAVIS
PROCESS OF SEPARATING THE CONSTITUENTS OF AIR AND OTHER GASEOUS MIXTURES
Filed July 7, 1920          6 Sheets-Sheet 2
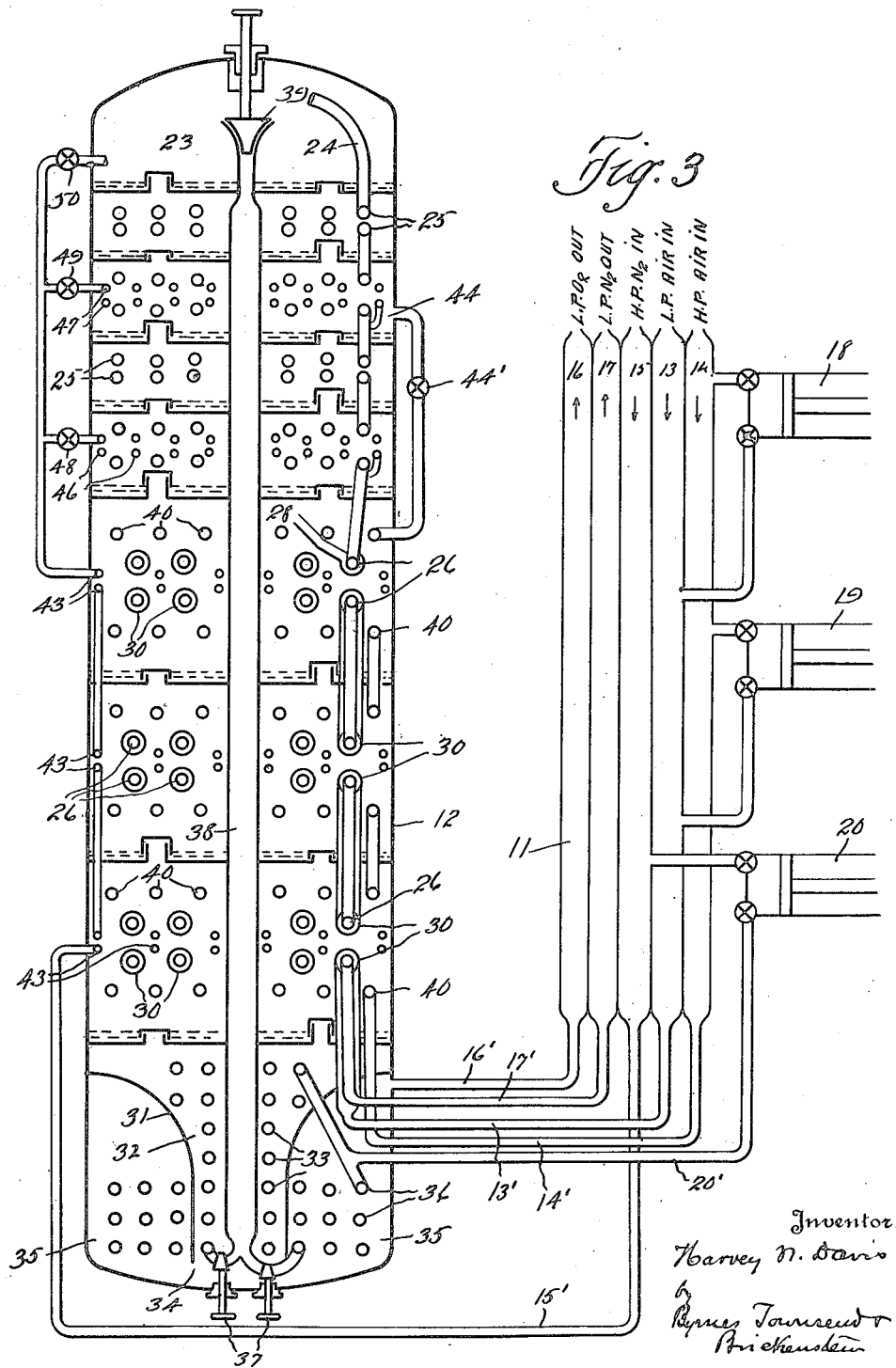

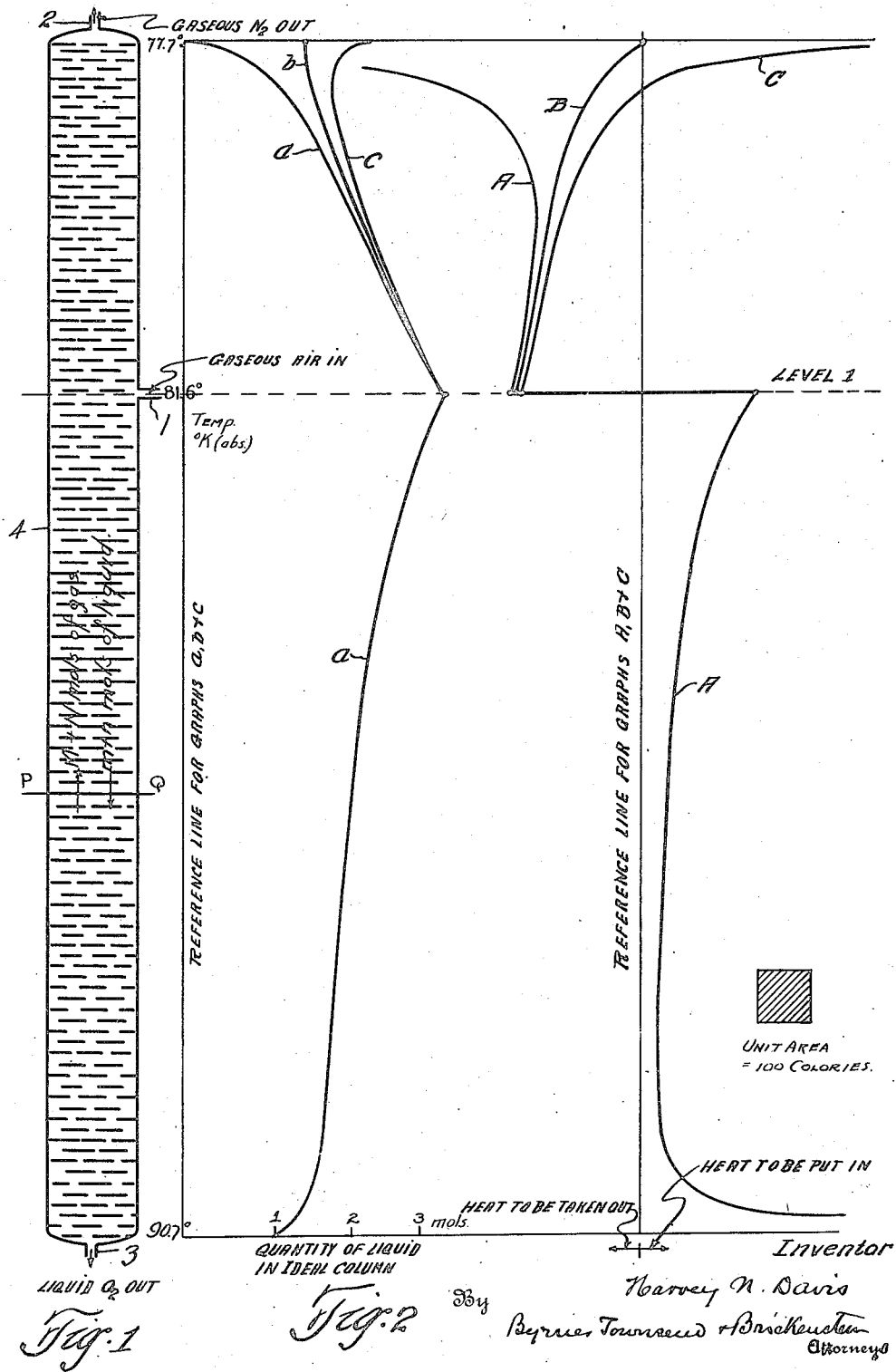

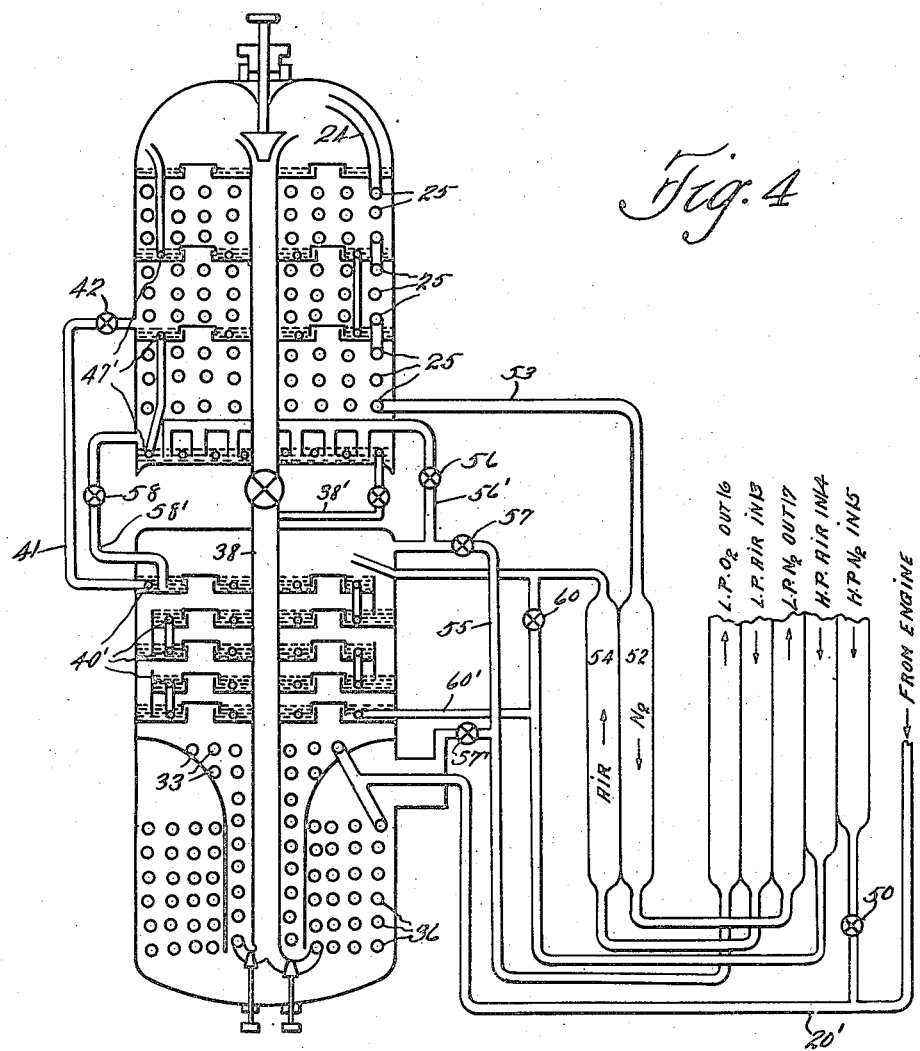

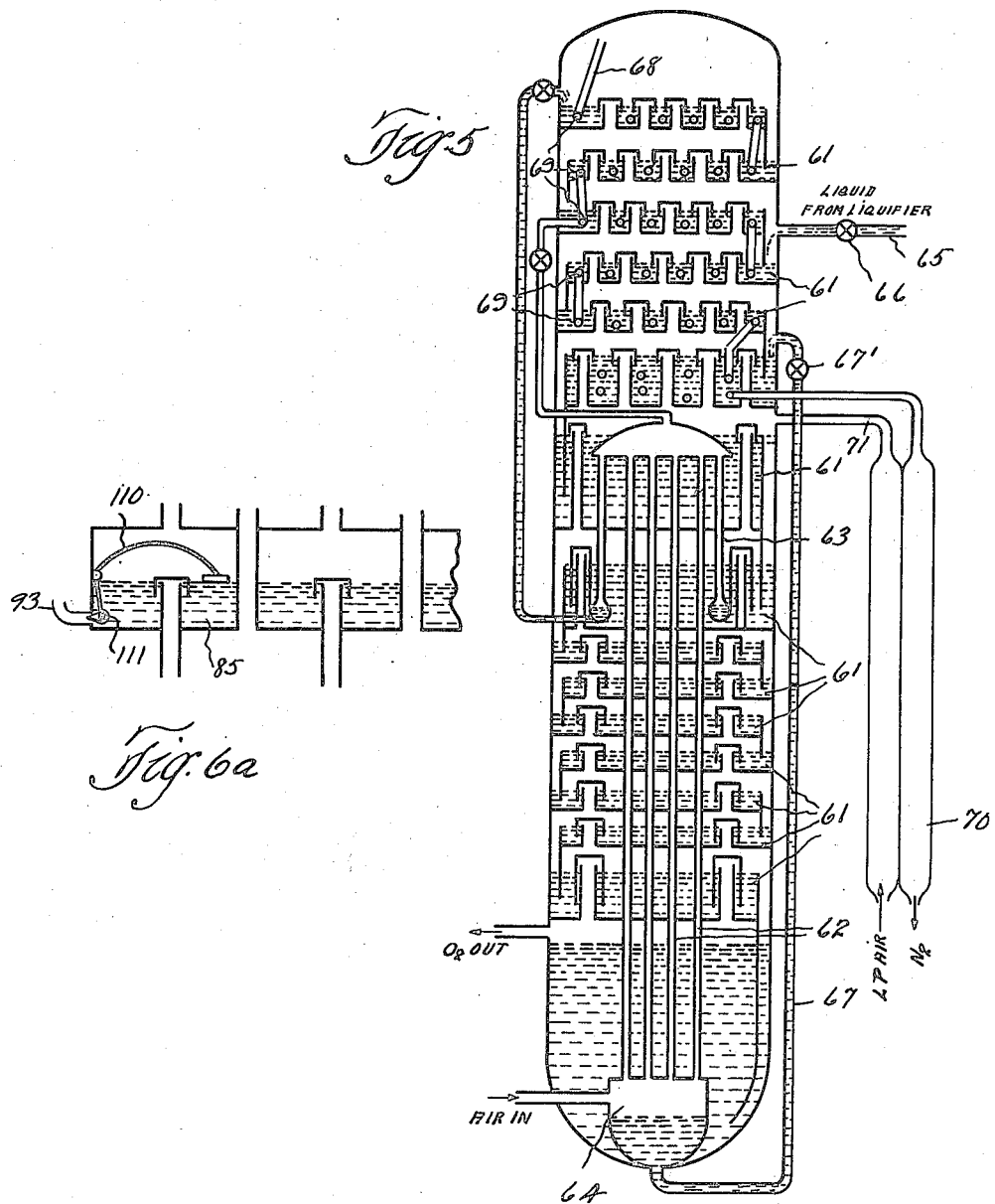

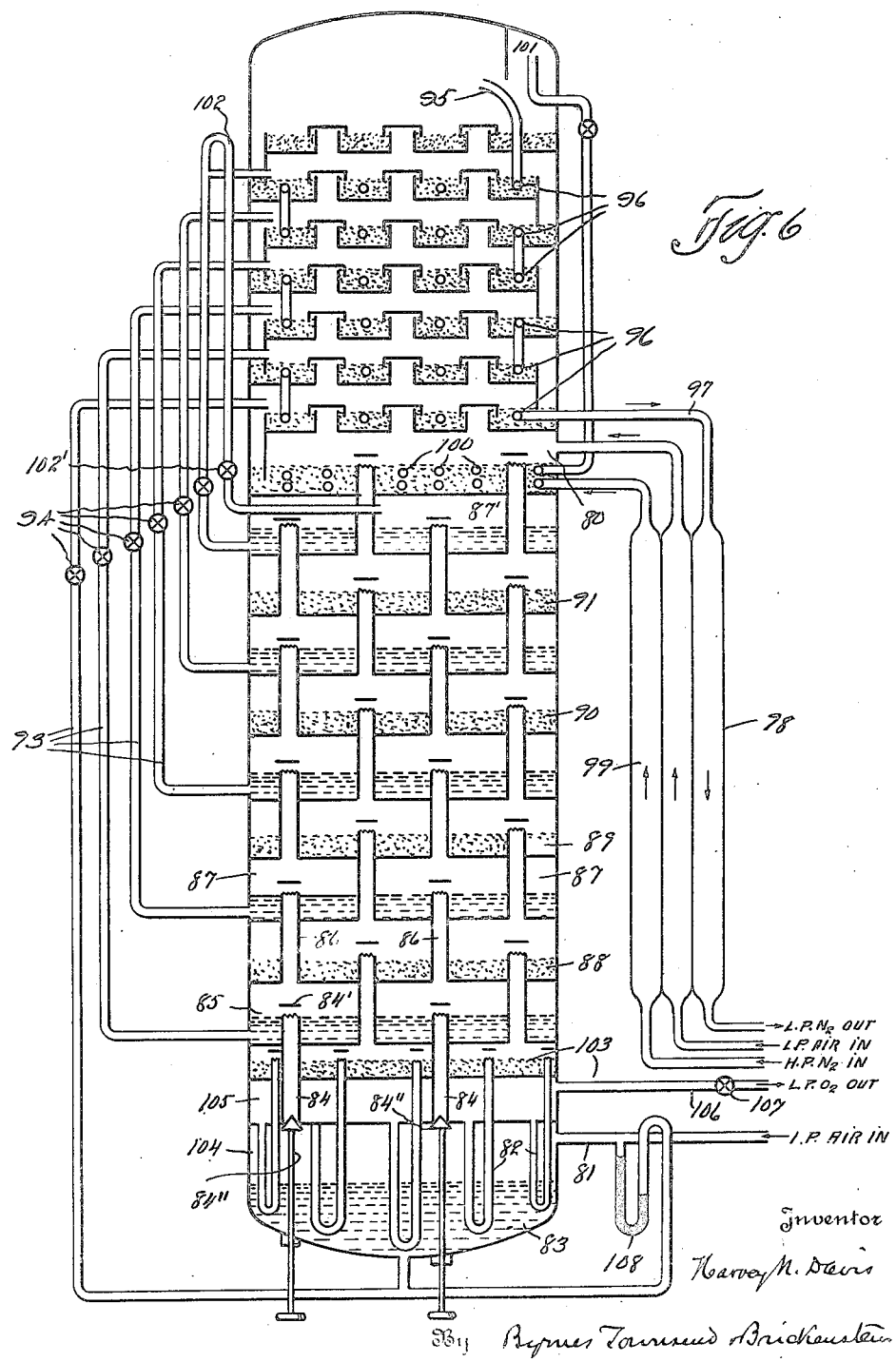

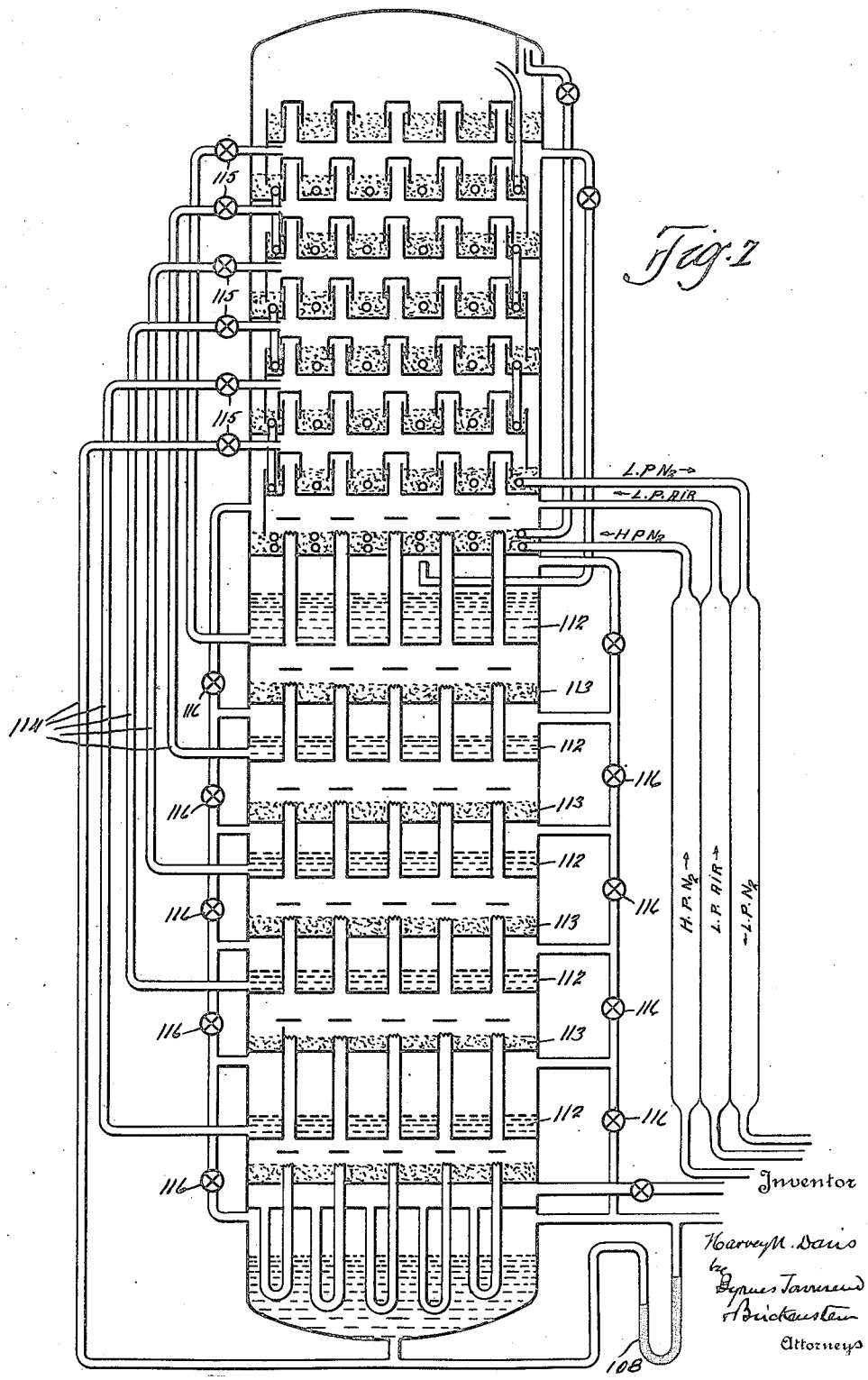

Patented Oct. 23, 1923.

1,471,832

UNITED STATES PATENT OFFICE.

HARVEY N. DAVIS, OF CAMBRIDGE, MASSACHUSETTS, ASSIGNOR TO RESEARCH CORPORATION, OF NEW YORK, N. Y., A CORPORATION OF NEW YORK.

PROCESS OF SEPARATING THE CONSTITUENTS OF AIR AND OTHER GASEOUS MIXTURES.

Application filed July 7, 1920. Serial No. 394,544.

*To all whom it may concern:*

Be it known that I, HARVEY N. DAVIS, a citizen of the United States, residing at Cambridge, in the county of Middlesex and State of Massachusetts, have invented certain new and useful Improvements in Processes of Separating the Constituents of Air and Other Gaseous Mixtures, of which the following is a specification.

The present invention relates to air liquefaction and distillation processes such as are now commonly used for the separation of pure oxygen or nitrogen, or mixtures rich in oxygen or nitrogen, from the atmosphere, and more particularly to that part of such processes which is generally referred to as rectification. The object of the invention is to make processes of the said kind more efficient, to reduce the power required to effect the separation of a given amount of useful product, and to decrease the cost of the useful product, which may be either oxygen or nitrogen of any useful degree of purity, or both.

It should be understood that my invention, at least in some of its aspects, is applicable to processes involving the separation of mixtures other than air, which liquefy at low temperatures, and that, in describing my invention with particular reference to the separation of air, I am not limiting myself to reference to this particular application of it.

For a full understanding of the invention reference is had to the accompanying drawings, in which—

Figs. 1 and 2 are diagrams introduced solely for expository purposes.

Figs. 3 to 7 are diagrams representing various alternative arrangements of rectification apparatus or of parts thereof embodying the various elements of the invention in alternative forms.

Before describing specific embodiments of the invention, I desire to explain certain underlying fundamental principles, an understanding of which will make the details of the various alternative embodiments much easier to follow. There are three fundamental principles that have guided the design of all the alternative arrangements proposed. These three principles are:—

I. The main rectification train should be run substantially at atmospheric pressure, and should be fed with as much unliquefied and substantially uncompressed air as possible.

II. Adequate means should be provided for transferring heat to or from the contents of the main rectification train at all levels, or, if this be impracticable, at a plurality of well distributed levels, and not merely, as is substantially the case in the present state of the art, at the top and bottom.

III. Appropriate streams of fluid of different compositions should be fed into the main rectification train at as many different, well distributed levels as possible, so as to minimize the heat transfer requirements mentioned in II.

These three principles may be further explained as follows:

I. The rectification train should be run substantially at atmospheric pressure and should be fed with as much unliquefied and substantially uncompressed air as possible.

I am well aware that there are certain advantages in running the main rectification train under a much higher pressure, in that it is not then necessary to maintain temperatures as low as those which must exist in a low pressure rectification train, and in that the greater densities of the gaseous fluids handled mean a more compact column for a given output, both of which considerations indicate that a high pressure rectification train will have smaller heat-leak losses than a low pressure train.

On the other hand, running the main rectification train under pressure is justified from the power standpoint only when a considerable part of the work required for compression is recovered in some useful form, as in at least one system previously patented. But unfortunately the efficiency of compressors and expansion engines is such that the increased losses in these machines will much more than overbalance the increased losses due to heat-leak in a low pressure system. The essential feature of such a system is that as large a part as possible of the air to be rectified shall be fed not only into the main rectification train itself, but also into the system as a whole, at the lowest possible pressure, that is to say at a pressure above atmospheric by just enough to keep this air in motion through the system against atmospheric pressure at the various outlets, and to admit of means for controlling this flow. There will, however, be cases in which it is desired to discharge the useful product of the rectification from the rectifying apparatus against a back pressure different from atmospheric, as for example when it is desired to pass oxygen-rich gas directly into a pipe line supplying compressed air to a blast-furnace. In any such case, the above reasoning shows that the rectification train should be run at the lowest pressure that will permit of maintaining the desired flow through the separation apparatus against the back-pressure maintained by other agencies at the point of discharge of the useful product, and it should be understood that this method of operation is included in the disclosure of this specification. According to my invention the only air that is materially compressed at all is that amount which will just suffice, under the most effective arrangements that can be devised, to furnish the heat-pumping power required to keep the system in operation.

II. Adequate means should be provided for transferring heat to or from the contents of the main rectification train at all levels, or at a plurality of well distributed levels and not merely, as is substantially the case in the present state of the art, at the top or bottom or both.

This proposition, which is of great importance, can best be explained by reference to Figs. 1 and 2. Fig. 1 represents diagrammatically a rectification train of the simplest possible type. Unliquefied air enters the train through the pipe 1, gaseous nitrogen, of any desired purity, leaves the top of the train through the pipe 2, and liquid oxygen of any desired purity leaves the train through the pipe 3. The interior of the shell 4 may be filled with a large number of trays of any well known type, or with baffles, glass beads, hollow aluminum balls, or any other well known structures, whereby a stream of gas rising through the shell under a slight pressure gradient, is brought into intimate thermal and physical contact with a stream of liquid descending through the shell under the action of gravity. That part in a column in which an ascending stream of gas and a descending stream of liquid intermingle and interact, together with the structure containing and controlling the streams will be referred to throughout the specification and the claims as a rectification train, as distinguished from the column which may and usually does contain, aside from the rectification train or trains, other structural elements or groups of elements participating in the process of rectification. It is assumed that at every level the compositions of the gaseous and liquid streams are such as to be in equilibrium with each other in accordance with the well known laws of two-phase binary mixtures, as represented, for example, by a diagram of a well known type, known as a Baly diagram. We assume further that the contents of the train are at substantially the same pressure throughout the height of the train, which, for clearness of exposition we will assume to be substantially one atmosphere. I wish it clearly understood, however, that similar considerations apply to rectification at any pressure. We assume further, merely for clearance of exposition that the temperature at the various levels in the train varies uniformly with height from that appropriate to orthobaric nearly pure oxygen liquid, at substantially atmosheric pressure, at the bottom of the train, to that appropriate to saturated, nearly pure nitrogen vapor, at substantially atmospheric pressure, at the top. And finally we assume that the air inlet pipe 1 is at that level at which the rising gaseous stream in the train has the composition of air.

We then enquire under what conditions this rectification train could theoretically be operated in the manner assumed.

Let us consider any lever PQ in the lower part of the train, at which the temperature is T. There will be a stream of liquid flowing down past this lever, carrying, say $m$ mols of oxygen per second and $n$ mols of nitrogen per second. There will also be a stream of gas flowing up past this level, carrying, say M mols of oxygen per second and N mols of nitrogen per second. To determine these four quantities $m$, $n$, M and N as functions of the temperature T, we have four equations expressing the facts; 1st, that the ratio of $m$ to $n$ is such that the liquid has the composition appropriate for phase equilibrium at the assumed temperature T, as indicated by a diagram of the well known Baly type; 2nd, that the ratio of M to N is such that the gas has the composition appropriate for phase equilibrium at the temperature T, as indicated by a diagram of the Baly type; 3rd, that $(m-M)$ is equal to the flow of pure oxygen out of the train at the bottom, because, if the train is in a steady state as regards operation, as much oxygen must be entering the portion of the train between PQ and the bottom in each second as is leaving it; and 4th, that $(n-N)$ must for a similar reason be equal to the flow of pure nitrogen out of the train at the bottom, this nitrogen being an impurity in the oxygen-rich product of the rectification. The values of $(m-M)$ and $(n-N)$ are easily computed from the total flow and purity of the oxygen rich product which it is desired to secure. These four equations determine $m$, $n$, $M$ and $N$ as functions of $T$ throughout the lower part of the train. Similar considerations determine them in all other parts of the train. The results for a typical case have been computed from Baly's data on oxygen-nitrogen mixtures, and are plotted to scale in Fig. 2. While the exact values plotted are probably somewhat incorrect because of errors in Baly's data, they, nevertheless, show clearly the fundamental features of the situation, and the above description will enable any one skilled in the art to make correct computations whenever more reliable data are available. In the typical case plotted in Fig. 2, the quantity of liquid that must be flowing down past each level in the train, must vary from level to level in substantially the manner shown by the graph $a$ in horizontal distances representing mols per second and vertical distances representing either temperatures, or heights in the rectification train of Fig. 1. As is common in theoretical discussions, the rectification is assumed to be distributed continuously over the height of the train. This graph $a$ of Fig. 2 shows that in a theoretically perfect rectification train of the type described, the quantity of matter in the descending liquid stream must be zero at the top of the train and must increase, at first very rapidly, and then more slowly, until the stream reaches the air inlet level 1 of Fig. 1. From this level down, the quantity of matter in the descending liquid stream must decrease, at first with some rapidity, then more slowly, and finally with considerable rapidity to a value at the bottom of the train that represents the quantity of nearly pure liquid oxygen leaving the train through the pipe 3 of Fig. 1. From this it is evident that there must be condensing action all through the upper part of the train down to the level 1, and vaporizing action all through the part of the train below the level 1. This means that heat must be withdrawn from the contents of the main rectification train at all levels above the level 1 and that heat must be imparted to the contents of the main rectification train at all levels below the level 1, if the train is to function in the ideal manner assumed above.

From a curve like graph $a$ of Fig. 2, one can determine as follows the rate at which heat must be transferred either to or from the contents of the train between any two neighboring levels corresponding to the temperatures $T$ and $T+dT$. Let $dQ$ be the required inflow of heat (in, say, calories per second). Then, approximately, $dQ$ will be equal to the excess of the liquid flow at the level $T$ over that at the level $(T+dT)$ multiplied by the latent heat of evaporation of one mol of the liquid. That is, approximately, $$dQ = -L\frac{d(m+n)}{dT}dT$$

and, for practical purposes $L$ may be assumed to be about 1500 calories per mol of liquid and to be the same at all levels in the train. Accurately $$dQ = -L\frac{d(m+n)}{dT}dT + (m+m)\frac{dh}{dT}dT - (M+N)\frac{dH}{dT}dT$$

where the latent heat, $L$, the total heat of the vapor, $H$, and the total heat of the liquid, $h$, are all slowly varying functions of the temperature $T$. Sufficiently exact experimental data are not yet available to make the use of the accurate equation worth while in practising my invention. Values of $dQ/dT$ computed by means of the approximate equation for the typical case mentioned above are plotted to scale as graph $A$ of Fig. 2. In such a plot, an area lying to the right of the vertical line and bounded by the vertical line, the graph $A$, and any two horizontal lines at levels corresponding to $T$ and $T+dT$ represents the rate (in calories per second) at which heat must flow into the contents of the train between the $T$ and $T+dT$ levels thereof, if the train is to operate in the ideal way described above. Similarly an area to the left of the vertical line represents a necessary outflow of heat.

It is therefore obvious that if, in a train of the type of Fig. 1, the two streams are to be everywhere substantially in equilibrium with each other, which is a thermodynamically essential condition for high efficiency, means must be provided for effecting the necessary heat transfers at the various levels, and that this should be done as far as possible by means of auxiliary streams of fluid which it is desirable, or at least thermodynamically permissible, to warm or cool as the case may be. Two such streams of fluid are obviously available, even in the simple train represented in Fig. 1. One of these is the stream of cold nitrogen product from the top of the train, which is, in the present state of the art usually carried direct to the much warmer interchanging system. This stream should be carried down through coils or other passages in intimate thermal but not physical contact with the contents of the rectification train, at least as far as the level 1 of Fig. 1, so that its heat absorbing power, which is available through the coldest and therefore most unmanageable temperature range in the whole apparatus may be made use of in the most effective possible way, namely in helping to solve the heat-removal problem inherent in the upper part of the main rectification train. Furthermore the air entering the train through the pipe 1 has left the main heat interchanging system at a temperature substantially equal to that appropriate to the bottom of the main rectification train, and its power to give up heat as it cools from this temperature to that appropriate to the level 1, is available throughout the temperature range below the level 1 in the main rectification train. In some dispositions of apparatus, as will be hereinafter described, this stream 1 of low pressure air may therefore advantageously be passed through coils or other passages in intimate thermal but not physical contact with the contents of the main rectification train through the whole or a considerable part of that portion of the train below the level at which it enters the train. If, as is the case in some of the dispositions of apparatus to be hereinafter described, other and more suitable means are provided for supplying an adequate amount of heat to the lower part of the main rectification train, then the stream of low pressure air in the pipe 1 of Fig. 1, may well be cooled to or toward the temperature appropriate to its inlet level by means of the stream of nitrogen-rich product which is caused to leave the shell of the main train at or near the level 1, after performing the function mentioned above, and to pass counter-current to the stream of air in a small auxiliary interchanger constructed either as a separate unit, or as an integral part of the structure of the lower part of the main column or still, or in an extension of the main interchanging system below the level at which the stream of oxygen product enters it.

Several other advantageous means of transferring heat to the contents of the lower part of the main rectification train will be described in later parts of these specifications, including streams of high pressure air which it is desirable to cool, streams of intermediate pressure air which it is desirable to cool and partly or wholly condense, and streams of nitrogen which it may be desirable either to condense or merely to cool. Each of these means will be mentioned in connection with another specific feature to which it is appropriate, but it should be understood that each has also the novel and great advantage of playing its appropriate part in effecting the necessary transfer of heat into the lower part of the main rectification train.

Certain advantageous means will also be described in detail later for taking heat out of the upper part of the main rectification train by means of streams of fluid in thermal but not physical contact with the contents of the main train at various levels thereof. In particular it is sometimes advantageous to form substantially pure nitrogen liquid in a manner to be described later, and to pass a part of this liquid through and evaporate it in coils of other passages in thermal but not physical contact with the contents of the main rectification train at various levels between the level 1 and the top of the train. It is also sometimes advantageous, as will appear later, to form other liquids richer in nitrogen than the liquid in the main rectification train appropriate to the level 1 in Fig. 1 and to pass parts of these liquids through, and partially evaporate them in, coils or other passages in thermal but not physical contact with those portions of the main rectification train between the level 1 and the levels at which the partially evaporated liquids may appropriately be mingled with the streams in the main train.

Each of these procedures has great advantages over putting the streams of liquid directly into the main train at levels below those to which their compositions are appropriate. Each has also certain advantages, in some cases, over putting the whole of each stream into the train at its appropriate level for reasons that will appear later. These procedures are mentioned here as examples of ways in which heat can be abstracted from the upper part of the main rectification train by cold streams of fluid other than the stream of nitrogen product mentioned above.

III. Even if the type of rectification train shown diagrammatically in Fig. 1 could be made operative solely by the means described above, the amount of necessary heat transfer in the upper part of the train would be unnecessarily large and difficult to effect in a practical manner. It is therefore advantageous to modify the rectification train itself by introducing streams of fluid other than the single stream of gaseous air represented in Fig. 1 as entering through the pipe 1. In all such modifications it is a fundamental thermodynamic principle that each stream should enter the main train only at that particular level to which its composition is appropriate. To secure the best results in minimizing the necessary heat transfer for ideal operation, or, in other words, to so modify the ideal heat transfer curve A of Fig. 2, that it shall lie as nearly along its vertical base line as possible, it is desirable that such streams as enter the train above the low pressure air inlet level 1 of Fig. 1 shall be wholly or largely liquid, and that such streams as enter the train below the low pressure air inlet level shall be wholly or largely gaseous. Means for providing gaseous or largely gaseous streams of appropriate composition for entrance below the level 1 are described in a co-pending application of Davis and Kleinschmidt Serial No. 394,545 filed July 7, 1920. Means for providing liquid or largely liquid streams of appropriate composition for entrance above the level 1 will now be described.

The most important liquid or largely liquid stream that can be fed into the upper part of a rectification train, is a stream of pure or nearly pure liquid nitrogen at the top of the train. Such a stream is already commonly used in the art. It is formed by some (see for example U. S. Patents No. 1,201,044 and No. 1,257,470) by supplying under pressure a stream of previously purified nitrogen, which is cooled in an interchanger, condensed by thermal interchange with a pool of the liquid oxygen discharged from the bottom of the rectification train, and then throttled in to the uppermost part of the train. This procedure may however be improved in either of two alternative ways. In the first place the pool of liquid oxygen fed from the bottom of the train is not the best available place to condense this nitrogen, as this is the warmest part of the column or still, and the pressure under which the nitrogen stream is supplied must therefore be higher if it is to be condensed in this way, than would be necessary if condensation is effected in other and cooler parts of the train. A better way of condensing a stream of nitrogen for use at the top of the train, and, if desired, for cooling the whole of the upper part of the train in the manner described in a previous paragraph of these specifications, is to pass this nitrogen stream through coils or other passages in thermal but not direct contact with the contents of that part of the main rectification train that lies just below the low pressure air inlet level 1 of Fig. 1, the pressure of the nitrogen being just sufficient to cause condensation under these much more favorable conditions. This procedure has also the advantage of giving heat to the contents of the main rectification train in a region where, according to graph A of Fig. 2, the desirable heat transfer rate is materially larger than at somewhat lower levels. Furthermore, under these conditions the nitrogen stream can be cooled in coils or other passages in thermal but not direct contact with the contents of the whole lower part of the train, with the double advantage of promoting the condensation of the nitrogen, and supplying heat to the contents of the main train at all levels below the level 1 of Fig. 1, in the manner previously mentioned.

With some dispositions of the rest of the apparatus, the stream of nitrogen mentioned in the last paragraph may be important not only as supplying wash-liquid for the uppermost part of the rectification train, but also because of its potential heat pumping power. Under these conditions it is desirable to pass it to the column under a higher pressure than that contemplated in the last paragraph. If, however, the pressure of this stream is raised only moderately above that necessary to secure condensation before the stream leaves the lower part of the column, either condensation with latent-heat absorption, or abnormally high specific heats will appear in the main interchanger system, with the disadvantageous results described in my co-pending application Serial No. 376,408. Under these conditions, the said stream of nitrogen may well pass through the interchanging system and enter the column or still, at or near its lower end, under a pressure that is materially above the critical pressure of nitrogen, and pass up through the whole lower part of the rectification train in coils or other passages in thermal but not direct contact with the contents of the train, thereby giving heat to the contents of the train at all levels below the level 1 of Fig. 1, and being itself cooled substantially to the temperature appropriate to the level 1 without any condensation whatever. When this stream of "high pressure" nitrogen is throttled from the level 1 into the top of the main train, liquid will be formed abundantly. Indeed a larger proportion of the stream will enter the main train in liquid form under these conditions, than when the whole of the stream is actually liquefied under a much lower pressure, and the resulting liquid is then throttled necessarily with partial evaporation, into the main train.

A second method of providing the nitrogen required to form the said liquid stream, also well known in the art (see for example U. S. Patent No. 981,748) consists in so treating a stream of air under pressure as to leave a gaseous residue which is nearly pure nitrogen, and subsequently condensing this nitrogen substantially in the manner described above. This procedure has a considerable advantage in that a separate nitrogen compressor and a separate supply of previously purified nitrogen are not necessary. This procedure, as now known to the art, can, however, be much improved by the application of the fundamental principles already described in these specifications. For example, since the process of condensation and rectification that goes on in the ascending or "backward return" tubes in the lower part of the well known Claude column, requires the removal of a considerable quantity of heat at all levels, and since the process that goes on in the lower part of the ideal rectification train of Fig. 1 requires the absorption of heat at all levels, it is obvious that each process will be furthered by putting it in thermal but not direct contact with the other. This means that the ascending or "backward return" tubes of the well known Claude column should be in thermal contact not merely with a single boiling off pool at the bottom of the column as in U. S. Patent No. 981,748, or with two or three such boiling off pools as in U. S. Patent No. 1,083,988 or even with a stream of liquid descending through an "evaporating compartment" situated below the main part of the rectification train as in U. S. Patent 950,436, but with the contents of the whole lower part of the main rectification train from the bottom thereof up to the lowest level at which any material to be rectified enters the train; that is to say, the Claude "backward return" tubes should be surrounded by, instead of wholly or partly surmounted by, the lower portion of the main rectification train up to the lowest inlet level, in a manner to be described later in connection with Fig. 5.

It is also obvious that, because of the shape of the ideal heat transfer graph A of Fig. 2, and in particular because of the fact that the amount of heat that should be given to the contents of the main rectification train at levels just below the low-pressure air inlet level is greater than at somewhat lower levels, it will be advantageous in some dispositions of apparatus, for example that shown in Fig. 5, to make the nitrogen condensing tubes much shorter than the backward return tubes, or to replace them by coils or other passages surrounding only the upper part of the backward return tubes, so that their heat yielding power may be concentrated in a part of the main retification train where it can be used to the best advantage.

Other means for forming from air under treatment the nitrogen desired for the upper part of the column will be described in later paragraphs of these specifications.

The effect of a stream of liquid nitrogen introduced at the top of the main rectification train, on the ideal heat transfer graph for the upper part of the train, is shown by graphs $b$ and B of Fig. 2. The introduction of an appropriate amount of nearly pure nitrogen liquid would just suffice to reduce to zero (or preferably to the magnitude of the inevitable heat leak into this part of the apparatus) the amount of heat transfer required to maintain the uppermost part of the ideal rectification train of Fig. 1 in operation, but the effect on the ideal heat transfer requirements at levels just above the low pressure air inlet would be small.

If a considerably larger quantity of nearly pure liquid nitrogen is introduced, conditions are modified as in graphs $c$ and C of Fig. 2. A considerable quantity of heat should now be put into the uppermost levels of the train, and if this heat is not supplied by special means or by heat-leak, the whole uppermost part of the train will cool toward a uniform temperature, and the rectification effect will be crowded down toward the low pressure air inlet until the longitudinal heat leak in that part of the column is sufficiently increased to provide the necessary heat. That is, the uppermost part of the train, will be drowned with liquid and will become largely inoperative. If, therefore, an excess of nitrogen liquid is available, it is not desirable to put all of it into the top of the train as is now commonly done in the art. It is much more advantageous to throttle a part or all of it into coils or other passages scattered through the whole upper portion of the main rectification train, and particularly in regions thereof just above levels at which streams enter the train, as in Fig. 4, so that a part of the said nitrogen liquid may be evaporated by heat withdrawn from the contents of the main train at these levels, and so that the quantity of liquid actually entering the uppermost part of the main rectification train may be not greatly in excess of the amount needed to make the desirable heat transfer rate there equal to the inevitable heat-leak rate.

If other liquids, richer in nitrogen than the liquid appropriate to the level 1 of Fig. 1, are available, and are introduced in appropriate quantities, each at the level to which its composition is appropriate, the effect on the ideal heat transfer curve of the upper part of the train is very marked. Each stream reduces the desirable heat withdrawal rate at the levels immediately below its point of entry, and may make an input of heat desirable just below its point of entry. Indeed if a very great number of such streams of appropriate magnitudes and compositions could be provided, the ideal heat transfer curve could be made to substantially coincide with its vertical baseline, or preferably with the line representing the inevitable heat-leak distributions.

Even under practical conditions several such streams can be fed into the upper part of a rectification train of the type herein described with great advantage. I am well aware of the fact that the use of a plurality of such streams of liquid has been described by others, notably by Claude in the aforementioned U. S. Patent No. 1,083,988, but never, to my knowledge, in connection with a stream of unliquefied or gaseous air, such as that represented as entering the train of Fig. 1 through the pipe 1, and it is this combination of a plurality of liquid streams with a lower gaseous stream which is most advantageous, I have furthermore, provided improved methods of forming one or more of these streams other than the uppermost or nearly pure nitrogen stream previously discussed.

In particular one such stream is especially easy to form. If a stream of air under pressure is wholly liquefied, either by the process described by Claude in U. S. Patent No. 967,104 and elsewhere, or in coils or passages in thermal but not direct contact with a pool of liquid oxygen fed from the lower end of the main rectification train, as is common in the art, the resulting liquid must have the composition of air, and even after it has been throttled to the pressure in the main train, with some inevitable accompanying evaporation, the remaining liquid will be much richer in nitrogen than the liquid appropriate to the level 1 in Fig. 1. Such a stream is therefore highly suitable for use, in the manner described above, at a suitable point in the upper part of a rectification train of the type under discussion. Nevertheless, such a stream has never, as far as I am aware, been used to supplement the gaseous air and liquid nitrogen streams mentioned above.

The process by which the stream mentioned above, and all other streams herein mentioned as entering the main rectification train at levels above the low pressure air inlet level 1 of Fig. 1, are formed may advantageously be modified as follows. It is obvious that if such streams can be further cooled after liquefaction but while still under pressure, the inevitable partial reevaporation that accompanies throttling will be reduced, and the remaining liquid will be richer in nitrogen. Means for effecting this further cooling in the main interchanger have already been described by others, and in particular by Claude in U. S. Patent No. 976,104. But inasmuch as no one has apparently been aware hitherto of the desirability of imparting heat to the contents of the main rectification train at all levels below the lowest level at which material enters the train, no one has, as far as I am aware, seen the desirability of still further cooling all liquid streams of the sort under consideration, by passing them through coils or other passages in thermal but not direct contact with the contents of the main rectification train throughout the region below the lowest level at which material enters the train.

It will be seen later that in the disposition of apparatus represented by Fig. 5, this improvement might well be applied to all three streams of liquid entering the upper part of the main rectification train, although no means for accomplishing it are actually represented in the figure, lest the said figure become too complicated for easy comprehension. The same is true of certain other streams in the other dispositions of apparatus to be described later, but the scope of this part of my invention should not be understood to be limited to those particular cases in which I have found it convenient to show it in the accompanying drawings.

Alternate desirable ways of forming a succession of nitrogen-rich liquids for use in the upper part of a rectification train, particularly in connection with an ingoing stream of low pressure air, will be described in later paragraphs of these specifications and especially in connection with Figs. 6 and 7.

A rectification train designed in accordance with these principles already discussed will be fed by two or more streams of material, at least one of which will enter the train at a point intermediate between its highest and its lowest level. The rectification train may therefore be regarded as divided by these levels at which material enters it, into two or more portions, each of which will hereinafter be called a run of the train, each run being a portion of the train within which there is no level at which material enters the train. If the amounts of material entering the train in each stream are wisely adjusted, each run except the lowest will have an ideal heat transfer curve such that heat should be supplied to the contents of the run at all higher levels thereof, and heat should be abstracted from all the lower levels thereof. In the lowest run heat should be supplied at all levels, no matter how the streams are adjusted.

Now each such run should, as has been mentioned, receive the full benefit of the cooling or heat absorbing power of the stream of nitrogen product from the top of the still, over the temperature range corresponding to the run in question. But in a thermally well balanced run only the lower levels need to loose heat. Therefore it is advisable to bypass the nitrogen product stream past the upper levels of the run and to concentrate its whole heat absorbing power, over the temperature range in question, into the lower levels of the run from which heat should be abstracted.

Furthermore the various streams of liquid that are to be throttled into the upper part of the main rectification train have been described as passing, while still under pressure through coils or other passages in thermal but not direct contact with the contents of the main train through the whole length of the lowest run thereof. It now appears that each of these streams may also be passed, while still under pressure, through coils or other passages in thermal but not direct contact with the upper levels of each run up to the level at which each said stream is to enter the main train, with advantage both to the liquid streams themselves, which it is desirable to cool as much as possible before they are throttled, and to the main rectification train, to which it is desirable to impart heat at the particular levels in question.

Having now described the fundamental principles which underlie my process for separating air or other gaseous mixtures into the constituents thereof, and having mentioned many of the novel and useful features thereof, I will describe as briefly as possible five alternative embodiments of some or all of the features of my invention and explain the operation thereof, pointing out in connection with each, such novel features, as have not already been mentioned.

Fig. 3 represents diagrammatically an interchanger 11 and a main rectification train contained in a shell or column 12. The interchanger which is more particularly described in my application Serial No. 376,408 carries three down-going streams 13, 14 and 15 composed, respectively, of L. P. air, H. P. air and H. P. nitrogen, and two up-going streams, 16 and 17 of products from the column or still. It may be stated here that pressures not materially higher than atmospheric pressure will be throughout referred to as "low pressures" (L. P.), pressures well above the critical pressures of the fluids in question as "high pressures" (H. P.), and pressures materially higher than atmospheric pressure and below the critical pressure as "intermediate pressures" (I. P.).

Three expansion engines 18, 19 and 20 fed by H. P. fluids, are provided in accordance with the principles described in my said application. In this particular case the coldest engine 20 is a nitrogen engine and exhausts I. P. nitrogen which is used in the still after the well known method of Hazard-Flamand. The other two engines 18 and 19 receive H. P. air from one duct 14 of the interchanger into which it is forced by a suitable compressor or compressors and exhaust L. P. air into another duct 13 as indicated.

The main rectification train in the column 12 consists of three runs defined by the level of the inlet 28 through which L. P. gaseous air is introduced into the column, and by the level of the inlet 44 at which H. P. air is throttled into the column after being so cooled as to liquefy almost completely at the throttle 44'.

Each of these streams is put in thermal contact with the contents of the lower run up to the level of the low-pressure air inlet 28 by being passed through the coils 30 and 40, respectively. Additional heating power for the lower run and additional cooling power for the lower portions of the two other runs are provided by utilization of the H. P. nitrogen stream.

From the interchanger 11 part of the H. P. nitrogen stream 15 is carried by pipe 15' to the coils 43 in the lower run. This stream is then, in the particular instance, divided and throttled through the valves 48 and 49 into the coils 46 and 47 respectively in the lower portions of the two upper runs. The remaining portion, if any, of this H. P. nitrogen stream is throttled through the valve 50 into the top of the main train.

The nitrogen product from the top of the column or still passes through the pipe 24 into and through the coils 25 and 26 to the bottom of the rectification train, being thereby warmed substantially to the temperature appropriate to the bottom of the interchanger to which it passes through the pipe 17', and being thereby caused to yield to the contents of the main train all of its available cooling power, which is thus used for the purposes described above, and to assist in keeping the train cold in the face of the various inevitable heat leaks.

The oxygen liquid leaving the main rectification train at the bottom thereof is deflected by the diaphragm 31 into the well 32 where it comes into thermal contact with a part of the I. P. nitrogen in the coil 33 and is subjected to a final purification by boiling, the intensity of which is regulated by one of the hand valves 37. The liquid oxygen then passes through the trap 34 into the outer boiling-off pool 35 where it is vaporized by heat exchange with the I. P. nitrogen in the coils 36 which are connected by pipe 20' with the exhaust side of the engine 20.

The gaseous oxygen product then leaves the still through the pipe 16'. In the meantime the largely or wholly liquified I. P. nitrogen from the coils 33 and 36 is throttled into the top of the main train through the valves 37, the riser 38 and the valve 39.

The arrangement of the diaphragm 31, the inner and outer boiling-off pools 32 and 35, the coils 33 and 36 and the valve 37 has a considerable advantage in that the oxygen product is kept entirely separate from the gas fed into the lower part of the rectification train, which latter portion is caused to contain the larger part of any nitrogen or other volatile impurity that reaches the bottom of the train. Meanwhile complete control over the relative quantities of the two portions of gas evaporated from the oxygen-rich liquid is afforded by the valves 37.

It will be seen that in the apparatus shown diagrammatically in Fig. 3, provision is made for transferring heat to the contents of the main rectification train at all levels of the lower run thereof in four different ways in addition to the inevitable heat leak, namely, 1st, from I. P. nitrogen which is being liquefied in the coil 33, 2nd, from L. P. air which is passing through the coil 30, 3rd from H. P. air which is passing through the coil 40, and 4th, from H. P. nitrogen which is passing through the coil 43. These four modes of heat transfer, together with the inevitable heat leak, will considerably exceed the cooling effect of the nitrogen-rich product in the coil 26. The excess inward heat transfer, as is obvious to the expert, can be made to approximate as closely as may be desired to the theoretically desirable distribution suggested by the curve A of Fig. 2, by a suitable disposition of the amount of heat transfer surface of the various coils mentioned above at various levels in the column, by providing many turns in regions where a large heat transfer rate is desirable, and vice versa. No attempt has been made in Fig. 3 to show a suitable disposition of coils, because the figure would be unduly complicated thereby, and because the necessary arrangements will be obvious to any one skilled in the art. Similar considerations apply to the upper part of Fig. 3, and to Fig. 4.

It may also be mentioned that while Fig. 2 shows the heat that must be transferred between various temperature limits, it is by no means necessary that this heat-transfer be distributed in space in the exact manner indicated, because it is by no means necessary that the vertical temperature gradient should be the same at all levels in the train, as was assumed, for convenience, in drawing Fig. 2. It is only necessary that the total heat-transfer be sufficient in amount, and that it be distributed over the whole of the lower run of the column of Fig. 3 in a substantially continuous manner. The distribution of temperatures through the run will then take care of itself. Similar considerations apply to the upper part of Fig. 3, and to Fig. 4.

In each of the two upper runs of Fig. 3, means are provided for abstracting heat by means of 1st, the nitrogen-rich product in the coils 25, and 2nd, by means of nitrogen liquid evaporating in the coils 46 and 47. Furthermore, the amount of heat which it is desirable to abstract can be controlled by controlling the amounts of liquid introduced at 39, at 50, and at 44, as set forth above. It is, therefore, obvious that the ideal conditions as to heat transfer set forth above, can be approximated as closely as may be desired by any one skilled in the art.

Starting up such an apparatus as that represented diagrammatically in Fig. 3 might present certain practical difficulties with respect to the supply of nitrogen for the high pressure stream 15 during the period while the apparatus is cooling down and beginning to function. This period might last several hours, and it is obvious that if the stream 15 must be supplied for several hours from a reserve of nitrogen accumulated from a previous run of this or another nitrogen producing apparatus, very large and expensive storage facilities might have to be provided.

Let us suppose that the stream 15 is started with air drawn from the initially warm region 23 at the top of the still through the pipes 24, 25 and 26, etc. and finally the interchanger 11. As the system cools down, a part of this air will be liquefied by the time it again reaches the space at the top of the still. Furthermore, the ascending column of gas or vapor in the still will begin to drop some liquid before it reaches the space 23. Since both of these liquefied portions will be richer in the less volatile constituent (here oxygen) than the streams from which they are formed, the remaining gaseous streams reaching the space 23 will be richer in the more volatile constituent (here nitrogen) than when they passed their respective compressors. The stream 15, which is continually fed from the space 23 will thus grow richer in the more volatile constituent (here nitrogen). This progressive purification of the contents of the space 23, from which stream 15 is fed, will ultimately lead to the steady state contemplated and above referred to.

This starting-up period can be materially shortened, if desired, by either of two alternatives, each of which involves only moderate storage facilities for pure nitrogen accumulated in a previous run. The first depends on the fact that the slow part of this progressive purification will be the last part, after the contents of the space 23 are nearly pure, but not quite pure enough to give the best results of which the apparatus is capable. I then propose to shift temporarily the source of the stream 15 from the space 23 (via the interchanger) to the stored supply of pure nitrogen. This will supply to the space 23 through the valve 39 an abundant supply of pure nitrogen liquid, which will gradually wash oxygen out of the ascending column of gas in the still, and force the upper part of the still into the desired steady state. This requires a storage of nitrogen only sufficient to supply the stream 15 while the out-going stream 17 is settling into its final pure or nearly pure state.

The starting-up period can be still further shortened, if desired, by a more far-reaching alternative, indicated in Fig. 4. Here the still or column is separated into two parts at a point corresponding to the level of inlet 28 in Fig. 3, and means are provided whereby the ascending column of gas or vapor in the lower part of the still may be diverted at the level of inlet 28 and returned through the pipe 55 to the up-going stream 16 in the interchanger system, without traversing the upper part of the still at all. At such times, the valve 57' may be partly closed to maintain an appropriate pressure gradient in the lower run. Meanwhile the incoming stream 13 of H. P. air is prevented from entering the upper part of the still by closing the valve 42, and is throttled into the top of the lower part of the still through the valve 60, thus providing a supply of liquid in the lower part of the still. Meanwhile the upper part of the still is filled with pure nitrogen from a stored supply, and this nitrogen is circulated through the out-going system of pipes 24, 25, etc., to 17, compressed, and returned as the stream 15, any necessary makeup being taken from the stored supply. The effect of continuing this process will be to cool the whole upper part of the still to the temperature appropriate to the space 23, and to store in it an accumulation of pure or nearly pure nitrogen liquid, without losing any considerable part of the reserve of pure or nearly pure nitrogen saved from previous runs. When the storage of liquid nitrogen in the upper part of the still is sufficient, the up-going gaseous stream from the lower part of the still is gradually diverted from its temporary to its final course by opening the valves 56 and 57' and closing the valve 57, liquid from the upper part of the still is gradually admitted to the lower part of the still by opening the valve 58 and the H. P. air stream is diverted to its intended course by closing the valve 60 and partly opening valve 42. The necessary readjustment of temperatures throughout the still will then take place quickly, without any material contamination of the pure or nearly pure nitrogen leaving the space 23.

The apparatus represented diagrammatically in Fig. 4 differs from that shown in Fig. 3 also in other respects. The stream of nitrogen product coming from the top of the still and passing into the pipe 24 and through the coils 25 is withdrawn from the still shell approximately at the L. P. air inlet level, through the pipe 53 and is caused to cool the L. P. air from the temperature at which it leaves the interchanger, substantially to that appropriate to the L. P. air inlet level, in a small auxiliary interchanger comprising passages 52 and 54 for the nitrogen and the L. P. air respectively.

Furthermore the liquid nitrogen cooling coils 47' in the upper runs of the train are here represented as being connected in series rather than in parallel and as being fed from the main liquid nitrogen riser 38 to which they are connected by the pipe 38' and as discharging directly into the upper part of the train.

Furthermore in Fig. 4 such additional nitrogen liquid as may be required for refrigeration or liquid-level maintenance in the upper part of the main train, is represented as being throttled through the valve 50 directly into the I. P. nitrogen exhaust pipe 20' from the engine 20, and as passing through the coils 33 and 36 with the rest of the I. P. stream.

All these will be recognized as merely alternative embodiments of the same fundamental principles embodied in the apparatus shown in Fig. 3.

As clearly indicated, the rectification train and the shell containing it are divided into two mechanical units at the level of the L. P. air inlet. Thermal relation is substantially eliminated and may exist in so far only as the necessary communications therebetween make an absolute thermal separation impossible. By suitable lagging, however, such incidental heat exchange may be reduced to a negligible quantity. Liquid communication between the upper unit and the lower unit is established by the pipe 58'. During the cooling down process described above, the H. P. air is throttled into the upper part of the lower unit through the valve 60 and enters the train together with the L. P. air cooled in the auxiliary cooler. After running conditions are established the H. P. air is passed by pipe 60' into and through coils 40' and, after being cooled in the lower run is fed through pipe 41 and throttle valve 42 into a region of the upper unit to which its composition is appropriate. Under running conditions, gaseous communication between the lower unit and the upper unit takes place through the pipe 56', and liquid communication takes place through the pipe 58'.

The apparatus represented diagrammatically in Fig. 5 is a column of the familiar Claude type so modified as to incorporate the more important features of my invention.

The trays 61 of the lower run of the main rectification train are in thermal contact with backward return pipes 62 or the nitrogen condensing pipes 63 or both. The liquid from the liquefier commonly used in Claude plants is kept separate from that collected in the receiver 64 at the bottom of the column and is fed into the column through the pipe 65 and the valve 66 at a higher level than that at which the liquid from the receiver 64 enters the train through the pipe 67 and the valve 67'. The nitrogen product is withdrawn from the top of the train through the pipe 68 and the coils 69 so that its heat absorbing power may be used in the upper runs of the train.

Unliquefied and substantially uncompressed air is cooled first in the main interchanger (not shown) and then in the auxiliary interchanger 70 and fed into the main train through the pipe 71 at a level below that at which the liquid from the receiver 64 enters the train.

It is evident that in this modification of a Claude column the backward return portion of the apparatus should be so designed and run as to give, in the receiver 64, not a liquid containing as little nitrogen as possible, but one intermediate in composition between the 21 to 25% oxygen liquid discharged from the valve 66 and the 47 to 49% oxygen liquid appropriate to the level of the L. P. air inlet 71 so that the four streams entering the main rectification train at and above the level 71 may be as well distributed as possible.

The various possibilities for subcooling the three liquid streams entering the upper part of the main rectification train that have been described above, are not illustrated in the drawing to avoid undue complexity, but I wish to have it understood that I consider this aspect as within the scope of my invention.

The arrangement represented diagrammatically by Fig. 6 differs from the previously discussed arrangement in the following respects. Two completely separate rectification trains, each of the ordinary or any preferred sort, are interlaced throughout the lower part of the apparatus below the level of the L. P. air inlet 80. One of these rectification trains is the lower run of the main rectification train, in which rectification takes place at atmospheric pressure between substantially pure oxygen at the bottom and that pair of co-existing phases, the gaseous one of which has the composition of air, at the top. This run should, as has been said, receive heat at every level. The second, interwoven rectification train is under what I have called an intermediate pressure. Gaseous (or, if necessary for refrigeration, partly liquefied) air enters this train at its lower end through the pipe 81 and comes in thermal but not direct contact with colder liquid oxygen inside the U-shaped pipes 82 whereby a part of the air is condensed and collected in the pool 83. The remaining I. P. gas then passes through the pipes 84 to the next higher cell or tray 85 of the I. P. rectification train, meeting in these pipes and while emerging from them, a counter-current stream of liquid overflowing from the tray 85 or descending as spray into the tray 85 from the protecting cap or hood 84' above each of the pipes 84 and being in part rectified thereby. It then passes up through the pipes 86 to the next higher I. P. cell or tray 87, and so on up the I. P. rectification train to the uppermost cell or tray thereof 87'. In this I. P. train, rectification takes place between limits set at the one end by the gas rising into the tubes 84, which, having suffered partial condensation, is somewhat less rich in oxygen than air, and, at the other, by substantially pure nitrogen in the space 87'. This I. P. train, is then similar to the upper run of the ideal train of Fig. 1, and should lose heat at every level. By interlacing the two trains in the manner indicated in Fig. 6, we provide each train with just the heat transfer conditions it needs for effective action at every level, heat being readily transferred from the contents of the I. P. train to the contents of the L. P. train, both through the large flat tube sheets forming the bottoms of the various cells or trays and through the walls of the tubes that connect the various cells or trays of each train with each other, by passing through a cell of the other train.

The descending stream of liquid in the L. P. or main train which is composed of the trays 88, 89, 90 and 91 is by this process diminished in quantity as it approaches the bottom of the train, just as it should be according to the discussion of the fundamental principle II discussed above. The descending stream of liquid in the I. P. or auxiliary train, on the other hand, would be increased in quantity as it approached the bottom of its train, were it not for the fact that all the cells or trays of this auxiliary train, or a plurality thereof, are provided with pipes 93 and throttle valves 94 by means of which suitable quantities of liquid are drawn off and throttled into the upper part of the main rectification train at appropriate levels. By these means we secure for the upper portion of the main rectification train precisely that considerable number of largely liquid streams which ensure, if appropriately handled, that no considerable quantity of heat need be either given to or abstracted from the contents of the upper part of the main train to give effective rectification at all levels.

In the design of Figure 6, as in all others herein described, the nitrogen product is withdrawn from the top of the main rectification train through a pipe 95 and a succession of coils 96 in thermal but not direct contact with the contents of the upper part of the main rectification train, so that its cooling or heat absorbing power may be used for refrigerative purposes, and to diminish somewhat the quantity of liquid that has to be provided by the various cells or trays of the auxiliary I. P. train. In this particular design, the stream of nitrogen product is represented as leaving the column at or near the low pressure air inlet 80, through a pipe 97 and as then passing through an auxiliary interchanger 98 counter-current to the stream of L. P. air about to enter the column, and to an auxiliary stream 99 of I. P., or preferably H. P. nitrogen. This stream 99 after being cooled in the manner just indicated, and by passing through a coil 100 in thermal contact with the contents of the main train just below the L. P. air inlet level, where the desired rate of heat transfer is especially great, is throttled into the uppermost part 101 of the main rectification train, thus supplementing the high nitrogen liquid supplied by the uppermost cell or tray 87' of the auxiliary I. P. train, and ensuring the desired purity in the nitrogen product.

The pipe 102 and valve 102' are provided so that some gas may be drawn off from the upper end of the I. P. rectification train, both to promote heat transfer at the levels just below the low pressure air inlet, and to remove helium, neon and other not easily liquefied portions of the air treated. This pipe may discharge into the main train at an appropriate level as shown in Fig. 6, or into the pipe 95 or coils 96, or into a separate passage leading out of the apparatus, as desired.

The most fundamental of the novel and useful features not previously mentioned in these specifications which I have embodied in the apparatus represented diagrammatically in Fig. 6, is the provision of two interwoven or interlaced rectification trains, one under a higher pressure than the other and each of such a nature that its heat transfer requirements supplement those of the other.

It is obvious that if partially automatic control of the column is desired, float controlled valves of any well known construction can be introduced to wholly or partially close the outlets from the various cells or trays of the I. P. train to the corresponding pipes 93 whenever the liquid levels in the said cells or trays fall below the predetermined heights. As indicated in Fig. 6ᵃ a float arm 110 may be hinged on the side wall of the trays 85 and operate the valve 111 controlling the pipe 93.

Another novel and useful element is as follows:

If the tubes 84 which connect the chamber 104 with the lowermost cell or tray of the I. P. rectification train are comparatively few in number and are provided with throttle or other valves 84'' whereby they may be partially closed, it will be possible to hold the pressure in the chamber 104 somewhat higher than that in the rest of the I. P. rectification train. This has the advantage of procuring a considerable flow of heat into the oxygen liquid that is being boiled in the U-tubes 82 while at the same time retarding the flow of heat into the parts of the main rectification train at somewhat higher levels. At still higher levels the heat transfer rate will increase again, because the whole temperature range covered by the I. P. train at any one pressure is several degrees less than the temperature range covered by the lower run of the main or L. P. train. It follows that even if adjacent parts of the two trains are nearly at the same temperature at levels just above the aforementioned throttle valves, the level of the L. P. train just below its low pressure air inlet will be several degrees cooler than the adjacent levels of the I. P. train, and vigorous heat transfer will occur. The advantage of this arrangement is that the distribution of heat transfer rates just described, namely very vigorous at the bottom, much less vigorous at somewhat higher levels, and more vigorous again at still higher levels, is just the sort of heat-transfer distribution that is shown by the graphs of Fig. 2 to be desirable.

Fig. 7 shows still another alternative embodiment of many of the elements of my invention. The distinguishing feature of this disposition of parts is the formation in the lower part of the column of a number of streams of liquid of different compositions, for use in the upper part of the main rectification train, by partial liquefaction only, without rectification. The arrangement of alternate I. P. cells 112 and L. P. cells 113 or trays in the lower part of the column is very similar to that of Fig. 6, but each I. P. cell 112 is connected with the next by pipes or passages so arranged that the ascending stream of gas does not come into contact with any liquid. Such liquid as collects in each I. P. cell is drawn off through one of the pipes 114 and passed through one of the throttle valves 115 into the upper part of the rectification at an appropriate point, for the purposes already described. The multiplicity of valves 116 in Fig. 7 is intended to give control of the distribution of the heat-transfer rate into the lower part of the main L. P. rectification train, by permitting some of the I. P. cells to be partly or wholly by-passed, or run in parallel with other cells, and by permitting the pressure to be lowered from cell to cell, as may be found expedient. This process whereby streams of liquid of different composition, for use in the upper part of a rectification train in the manner previously described, are formed by partial liquefaction without rectification, may, under some circumstances, be of great value. It is obvious that the cells 112 of the I. P. system might be replaced by coils connected by pipes provided with liquid collecting traps or pockets or by other obvious substitutes without departing from the spirit of my invention.

It should be understood that in the foregoing the invention has been described in connection with the separation of air, merely in order to furnish a concrete example of its application, and that it is, neither in principle nor in practice by any means limited thereto. The claims appended hereto have therefore not been limited to the separation of air explicitly but are broadly directed to the separation of any gaseous mixture which may lend itself to treatment by rectification.

In the following formulation of the elements of my invention I wish certain expressions, which are used as convenient abbreviations for much longer expressions, to be understood in each and every case to have the meanings assigned to them in this and the following paragraphs. The word "rectification" shall be understood to refer to any process whereby a stream of gas or vapor, moving from a warmer to a colder region, and a stream of liquid, moving in the opposite direction, are brought into intimate physical as well as thermal contact with each other, so that either material or heat can pass freely from one stream to the other. Some authorities classify such processes into various categories, the word rectification being reserved by these authorities for special classes of processes of this general type, and other expressions, such as "clarification," "dephlegmation," "continuous progressive distillation," "purification by selective solubility," and so on, being used for other classes of such processes. It is desired that the word "rectification" in the following claims shall not be construed in any such restricted sense, but shall be understood to include any and all processes meeting the above very general definition, including processes in which material is added to or withdrawn from either or both streams in other ways than by transference between the two streams, and including processes in which heat is added to or withdrawn from either or both streams in other ways than transference between the two streams.

It is also desired that the words "train" and "rectification train" be understood as referring either to the two interacting streams mentioned above, or to the enclosure, baffles, trays, and so on used to confine and control the said streams, as the context may indicate, but not to any other streams or bodies of material, or to any pipes, passages, chambers, or other structural elements that may be contiguous to a rectification train or contained within the same structure or column that contains a rectification train.

Reference will frequently be made in the appended claims to a "stream of material to be rectified" or to a stream of fluid that "enters" or "passes into" a rectification train. It is desired that no part of the main stream of liquid appertaining to the rectification train itself, which is sometimes originated by a condenser at one end of the train, nor any part of the main stream of gas appertaining to the rectification train itself, which is usually originated by the evaporation of a pool of liquid at the other end of the train, shall be confused with, or identified as any one of the streams explicitly mentioned in the following claims as entering or passing into a train or supplying a train with material to be rectified.

In the appended claims a stream of fluid will sometimes be referred to as entering a rectification train at a level to which the composition of the stream "is appropriate." It is desired that this shall be understood to mean a region in the train where the gaseous stream of the train has substantially the same composition as that of the gaseous portion of the stream of fluid, if the said stream is largely or wholly gaseous, and a region where the liquid stream of the train has substantially the same composition as that of the liquid portion of the stream of fluid, if the said stream is largely or wholly liquid.

The letters H. P. applied to a fluid or stream of fluid shall mean that the said fluid is under a pressure materially greater than its critical pressure. The letters I. P. applied to a fluid or stream of fluid shall mean that the said fluid is under a pressure less than its critical pressure, but materially higher than atmospheric pressure. The letters L. P. applied to a fluid or stream of fluid shall mean that the said fluid is under a pressure substantially equal to that of the atmosphere, or greater than atmospheric only by such an amount as might reasonably be provided to procure adequate flow through the various parts of the apparatus, and to enable the said flow to be appropriately controlled. On the other hand the words "high pressure," "low pressure," "higher pressure," "lower pressure" and the like when not abbreviated as above, shall not be understood to have any special meanings other than those which the context would normally indicate. Furthermore, the word "run," when applied to a portion of a rectification train, shall mean a portion thereof within which no material either enters or leaves the train, each such run being bounded above and below by levels at each of which a stream of material does either enter or leave the train.

It is desired that whenever the phrase "the less volatile constituent" is used in the appended claims it shall have that one of the following meanings which is appropriate to the gaseous mixture to be separated. If the mixture is a true binary mixture, the phrase shall mean that one of the two constituents which has the higher boiling temperature at the pressure at which the train is operated. If the mixture is air, the phrase shall mean oxygen. If the mixture is any other gaseous mixture which, like air, contains considerable quantities of two major constituents, and relatively much smaller quantities of other minor constituents, the phrase shall be understood to refer to the less volatile of the two major constituents. And in general the phrase shall be understood to refer to the constituent or constituents which tend to concentrate at the warmer end of the rectification train. The phrase "the more volatile constitutent" shall be interpreted in an analogous and complementary way.

Finally, when a plurality of levels are spoken of as "well distributed" over a specific portion of a rectification train, it is desired that this be understood to mean that there are at least three such levels, none adjacent to each other, lying at or near the top of the portion, one at or near the bottom of the portion and one at or near the middle of the portion. It is applicant's intention, in using the phrase, to refer to a group of levels that may properly be regarded as fairly representative, in any practical mode of construction, of all the levels of the portion, as regards heat transfer.

I claim:—

1. In a process of separating a gaseous mixture into portions of different compositions by L. P. rectification, the step which consists in abstracting heat from the contents of the rectification train at a plurality of levels well distributed between the lowest level at which material enters the train and the top of the train, by putting colder fluids in thermal but not direct contact with the said contents.

2. In a process of separating a gaseous mixture into portions of different compositions by L. P. rectification, the steps which consist in abstracting heat from the contents of the train at a plurality of different levels between the top of the train and the lowest level at which material is introduced and imparting heat to the contents of the train at a plurality of different levels between the lower end of the train and the lowest level at which material is introduced.

3. In a process of separating a gaseous mixture into portions of different compositions by L. P. rectification, the steps which consist in abstracting heat from the contents of the train at substantially all levels between the top of the train and the lowest level at which material is introduced into the train and imparting heat to the contents of the train at substantially all levels between the bottom of the train and the lowest level at which material is introduced.

4. In a process of separating a gaseous mixture into portions of different compositions by rectification, the steps which consist in introducing material into a rectification train at a plurality of levels other than at the top of the train and abstracting heat from the contents of the train at levels just above each of said levels other than at the top at which material is introduced into the train.

5. In the art of separating a gaseous mixture into portions of different compositions by L. P. rectification, the process which consists in bringing an L. P. stream of the mixture into thermal but not direct contact with the contents of a rectification train at a plurality of well distributed levels in the warmest "run" of the train and then discharging the said stream into the train at a level to which its composition is appropriate.

6. In the art of separating a gaseous mixture into portions of different compositions by L. P. rectification, the process which consists in bringing an L. P. stream of the mixture into thermal but not direct contact with the contents of a rectification train at substantially all levels in the warmest "run" of the train and then discharging the said stream into the train at a level to which its composition is appropriate, 7. In a process of separating a gaseous mixture into portions of different compositions by rectification, the steps which consist in bringing a stream of the mixture under substantially the same pressure as that in a train into thermal but not direct contact with the contents of the train at a plurality of well distributed levels below the level in the train to which the composition of the stream is appropriate, but not at any higher level, and then discharging the said stream into the train at the said appropriate level.

8. In a process of separating a gaseous mixture into portions of different compositions by rectification, the steps which consist in bringing a stream of the mixture under substantially the same pressure as that in a train into thermal but not direct contact with the contents of the train at substantially all levels below the level in the train to which the composition of the stream is appropriate, but not at any higher level, and then discharging said stream into the train at the said appropriate level.

9. In a process of separating a gaseous mixture into portions of different compositions by L. P. rectification, the steps which consist in providing a stream of fluid rich in the more volatile constituent and abstracting heat therefrom under such conditions that when the said fluid is throttled the resulting fluid is at least partly liquid, then throttling at least part of the said stream, and causing the resulting liquid to evaporate in thermal but not direct contact with the contents of a rectification train in a portion thereof, above the warmest "run" under conditions causing abstraction of heat from the contents of the train.

10. In a process of separating a gaseous mixture into portions of different compositions by L. P. rectification, the steps which consist in providing a stream of fluid rich in the more volatile constituent and abstracting heat therefrom under such conditions that when the said fluid is throttled the resulting fluid is at least partly liquid, and then throttling at least part of the said stream into thermal but not direct contact with the contents of a rectification train in the warmer portion of a "run" other than the warmest "run", under conditions causing abstraction of heat from the contents of the train.

11. In a process of separating a gaseous mixture into portions of different compositions by L. P. rectification, the steps which consist in providing a stream of fluid rich in the more volatile constituent and abstracting heat therefrom, under such conditions that when the said fluid is throttled the resulting fluid is at least partly liquid, and then throttling a plurality of portions of the said stream into thermal but not direct contact with the contents of a rectification train at a plurality of levels thereof above the warmest "run" thereof, under conditions causing abstraction of heat from the contents of the train.

12. In a process of separating a gaseous mixture into portions of different compositions by L. P. rectification, the steps which consist in providing a stream of fluid rich in the more volatile constituent and abstracting heat therefrom under such conditions that when the said fluid is throttled the resulting fluid is at least partly liquid, and then throttling a plurality of portions of the said stream into thermal but not direct contact with the contents of a plurality of portions of a rectification train, each such portion being in the warmer part of a "run" of the train other than the warmest "run" thereof, under conditions causing abstraction of heat from the contents of the train in the said portions thereof.

13. In a process of separating a gaseous mixture into portions of different compositions by rectification, the steps which consist in providing a stream of fluid rich in the more volatile constituent and abstracting heat therefrom, under such conditions that heat is transferred therefrom to the contents of a rectification train at a plurality of levels well distributed over the warmest "run" thereof, and that when the said fluid is throttled the resulting fluid is at least partly liquid, and then throttling at least part of said stream of fluid into thermal but not direct contact with the contents of the train in a region above the warmest "run" thereof, and finally passing the above mentioned throttled portion of the said stream into the train at a level to which its composition when entering is appropriate.

14. In a process of separating a gaseous mixture into portions of different compositions by rectification, the steps which consist in providing a stream of fluid rich in the more volatile constituent and abstracting heat therefrom under such conditions that when the said fluid is throttled the resulting fluid is at least partly liquid, then throttling at least part of the said stream into thermal but not direct contact with the contents of a portion of a rectification train, said portion being above the warmest "run" of the train but below the level to which the composition of the throttled stream would be appropriate, whereby at least part of the liquid is evaporated and heat is abstracted from the contents of the train, and then discharging the above mentioned throttled portion of the said stream into the train at a level to which its composition when entering is appropriate.

15. In a process of separating a gaseous mixture of different compositions by rectification, the steps which consist in providing a stream of fluid rich in the more volatile constituent and abstracting heat therefrom, under such conditions that, when the fluid is throttled the resulting fluid is at least partly liquid, throttling one part of the said stream into thermal but not direct contact with the contents of a rectification train in a region above the warmest "run" thereof, and throttling another part of the said stream into the top or cold end of the train.

16. In a process of separating a gaseous mixture into portions of different compositions by rectification, the steps which consist in providing a stream of fluid rich in the more volatile constituent and abstracting heat therefrom, under such conditions that, when the fluid is throttled the resulting fluid is at least partly liquid, separately throttling a plurality of portions of the said stream into thermal but not direct contact with the contents of a rectification train at different levels thereof above the warmest "run" thereof, under conditions to abstract heat from the said contents, and throttling another portion of the said stream into the top or cold end of the train.

17. In a process of separating a gaseous mixture into portions of different compositions by rectification, the step which consists in putting products rich in the more volatile constituent from the top of the train without material change of pressure in thermal but not direct contact with the contents of the train at a plurality of levels intermediate the warm and cold ends of the train.

18. In a process of separating a gaseous mixture into portions of different compositions by rectification, the step which consists in putting products rich in the more volatile constituent of the mixture from the top of the train, without material change of pressure, in thermal but not direct contact with the contents of the train at progressively warmer levels in the train.

19. In a process of separating a gaseous mixture into portions of different compositions by rectification, the step which consists in putting products rich in the more volatile constituent of the mixture from the top of the rectification train, without material change of pressure, in thermal but not direct contact with the contents of the train at a plurality of well distributed levels between the upper end of the train and the lowest level at which material is introduced into the train.

20. In a process of separating a gaseous mixture into portions of different compositions by rectification, the step which consists in putting products rich in the more volatile constituent from the top of the train, without material change of pressure, in thermal but not direct contact with the contents of the train at substantially all levels between the upper end of the train and the lowest level at which material is introduced into the train.

21. In a process of separating a gaseous mixture into portions of different compositions by rectification, the step which consists in putting products rich in the more volatile constituent from the top of the train, without material change of pressure, in thermal but not direct contact with the contents of the train just above a level at which a stream of material enters the train.

22. In a process of separating a gaseous mixture into portions of different compositions by rectification, the step which consists in putting products rich in the more volatile constituent from the top of the train, without material change of pressure, in thermal but not direct contact with the contents of the train at levels lying just above levels at which streams of material enter the train.

23. In a process of separating a gaseous mixture into portions of different compositions by rectification, the step which consists in putting products rich in the more volatile constituent from the top of the train, without material change of pressure, in thermal but not direct contact with the contents of the train at substantially all levels intermediate the warm and cold ends of the train.

24. In a process of separating a gaseous mixture into portions of different compositions by rectification, the steps which consist in cooling a stream of the mixture to the temperature of a level of a rectification train to which its composition is appropriate, introducing the cooled mixture under substantially atmospheric pressure, into the train at the appropriate level and putting the product rich in the more volatile constituent from the top of the train, without change of pressure, in thermal but not direct contact with the contents of the train above the level of the inlet for the mixture.

25. In a process of separating a gaseous mixture into portions of different compositions by rectification, the steps which consist in putting products rich in the more volatile constituent from the top of the train, without material change of pressure, in thermal but not direct contact with the contents of the train at a plurality of well distributed levels of the train and then passing the said products in heat-interchanging relation with a stream of the mixture on its way to the rectification train.

26. In a process of separating a gaseous mixture into portions of different composition by rectification the steps which consist in putting products rich in the more volatile constituent from the top of a rectification train immediately in thermal but not direct contact with the contents of the train at levels above that level where the gaseous stream of the train has the composition of the mixture, then putting the said products in counter-current heat-interchanging relation with a stream of the mixture under substantially atmospheric pressure and then passing the cooled stream of the mixture into the train at the said level.

27. In a process of separating a gaseous mixture into portions of different compositions by rectification, the steps which consist in passing a stream of the mixture under substantially atmospheric pressure into the column near the warm end thereof, then upwardly in thermal but not direct contact with the contents of the train, to a level where the gaseous stream in the train has the composition of the mixture, putting a stream of products rich in the more volatile constituent from the top of the train immediately in thermal but not direct contact with the contents of the train at levels above said level, then putting the said products in counter-current heat-interchanging relation with the said stream of the mixture, and passing the stream of the mixture into the train at said level.

28. In a process of rectifying gaseous air, the steps which consist in putting nitrogen-rich products from the top of a rectification train immediately in thermal but not direct contact with the contents of the train above a level where the gaseous stream in the train has the composition of air, then passing the said products in counter-current heat-interchanging relation with a stream of air under atmospheric pressure, and then putting the said products into counter-current heat-interchanging relation with the same stream of air together with streams of other fluids under conditions causing the cooling of the said streams to approximately the temperature appropriate to the warm end of the train.

29. In a process of separating a gaseous mixture into portions of different compositions, the steps which consist in putting a stream of the mixture under a pressure materially higher than its critical pressure, cooling the stream substantially to the temperature of the warmer end of a rectification train, then additionally cooling the stream by thermal but not direct contact with the contents of the train at well distributed levels in the lowest "run" thereof, and then throttling the thus cooled stream into the train at a level to which the composition of the liquid formed by throttling is appropriate.

30. In a process of separating a gaseous mixture into its constituents by rectification, a method of providing wash liquid, rich in the more volatile constituent, for maintaining appropriate conditions in a rectification train, which consists in putting a stream of I. P. mixture in thermal but not direct contact with the contents of the train at a plurality of well distributed levels, between the warm end of the train and the warmest level at which material enters the train, whereby the I. P. mixture is partly liquefied and a gaseous residue very rich in said constituent is left, then condensing the said gaseous residue by heat-exchange with the contents of the train, and then throttling the condensate thus formed into the cold end of the train.

31. In a process of separating a gaseous mixture into its constituents by rectification, a method of providing wash liquid, rich in the more volatile constituent, for maintaining appropriate conditions in a rectification train, which consists in putting a stream of I. P. mixture in thermal but not direct contact with the contents of the train at a plurality of well distributed levels, between the warm end of the train and the warmest level at which material enters the train, whereby the I. P. mixture is partly liquefied and a gaseous residue rich in said constituent is left, then separating the gaseous residue from the liquefied portion, then condensing the said gaseous residue by heat-exchange with the contents of the train just below a level at which material enters the train and then throttling the condensate thus formed into the cold end of the train.

32. In a process of separating a gaseous mixture into its constituents by rectification, a method of providing wash-liquid, rich in the more volatile constituent for maintaining appropriate conditions in a rectification train which consists in putting a stream of I. P. mixture in thermal but not direct contact with the contents of the train at substantially all levels thereof between the warm end of the train and the warmest level at which material enters the train, whereby the I. P. mixture is partly liquefied and a residue rich in said constituent is left, then separating the gaseous residue from the liquefied portion, then putting the gaseous residue in thermal but not direct contact with the contents of the train successively throughout a plurality of regions each lying just below a level at which material enters the train, whereby the said gaseous residue is largely or wholly liquefied, and then throttling the resulting liquid into the train at a level near the cold end thereof.

33. In a process of separating a gaseous mixture into portions of different compositions by rectification, the steps which consist in passing a stream of an unliquefied stream of the mixture into a rectification train, at the level in the train to which it is appropriate and under a pressure and at a temperature substantially equal to those in the train at the said level, bringing a stream of the mixture under a higher pressure into thermal but not direct contact with the contents of the train at substantially all levels between the warm end thereof and the level at which the first mentioned stream of the mixture enters the train so as to cause two or more portions thereof of different compositions to be successively liquefied, separately collecting the different portions, and throttling them into different parts of the train at levels to which their compositions are appropriate.

34. In a process of separating a gaseous mixture into portions of different compositions by rectification, the steps which consist in passing a stream of the mixture under pressure upwardly from the warmer end of a rectification train in thermal but not direct contact with the contents thereof at substantially all levels below the lowest level at which material enters the train, thereby causing successive condensations of the said stream, separately collecting condensation products of different compositions, and separately throttling them into the train at levels to which their respective compositions are appropriate.

35. In a process of separating a gaseous mixture into portions of different compositions by rectification, the steps which consist in passing a stream of the mixture under pressure upwardly from the warmer end of a rectification train in thermal but not direct contact with the contents thereof at substantially all levels below the lowest level at which material enters the train, thereby causing successive condensations and rectification of the said stream, separately collecting condensation products of different compositions, separately throttling them into the train at levels to which their respective compositions are appropriate, withdrawing a gaseous residue consisting chiefly of the more volatile constituent, condensing the said gas by bringing it into thermal contact with the contents of the rectification train and then passing the liquid formed into the cold end of the train.

In testimony whereof, I affix my signature.

HARVEY N. DAVIS.